United States Patent
Katayama

(10) Patent No.: US 6,665,466 B2
(45) Date of Patent: Dec. 16, 2003

(54) OPTICAL MULTIPLEXER/DEMULTIPLEXER

(75) Inventor: Makoto Katayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 190 days.

(21) Appl. No.: 09/895,417

(22) Filed: Jul. 2, 2001

(65) Prior Publication Data

US 2002/0044731 A1 Apr. 18, 2002

Related U.S. Application Data

(60) Provisional application No. 60/234,194, filed on Sep. 20, 2000.

(30) Foreign Application Priority Data

Sep. 5, 2000 (JP) .................................... P2000-268982

(51) Int. Cl.[7] .............................. G02B 6/28; G02B 6/34
(52) U.S. Cl. ........................................... 385/24; 385/37
(58) Field of Search ............................. 385/24, 37, 43

(56) References Cited

U.S. PATENT DOCUMENTS 6,339,664 B1 * 1/2002 Farjady et al. ................ 385/24
6,442,308 B1 * 8/2002 Han et al. ..................... 385/24
6,529,660 B2 * 3/2003 Nakajima ..................... 385/37

FOREIGN PATENT DOCUMENTS

JP   2599786   1/1997

OTHER PUBLICATIONS

Baihukan, "Applied Optics I," Jul. 20,1990, 1$^{st}$ edition.

* cited by examiner

*Primary Examiner*—Chandrika Prasad
(74) *Attorney, Agent, or Firm*—McDermott, Will & Emery

(57) ABSTRACT

The present invention relates to an optical multiplexer/demultiplexer having a structure for actively compensating for distortion due to aberration of wavelength characteristics or the like among signal channels and effectively reducing loss variation or the like. In the optical multiplexer/demultiplexer, optical input ends of output waveguides arrayed corresponding to signals of channel wavelengths set at predetermined wavelength intervals are arranged so that an optical input end of at least either one of these output waveguides is located inside a Rowland circle. This structure effectively reduces the loss variation etc. among the signal channels.

9 Claims, 5 Drawing Sheets

PRIOR ART

OPTICAL MULTIPLEXER/DEMULTIPLEXER

CROSS-REFERENCE TO RELATED APPLICATION

This application claims priority to Provisional Application Ser. No. 60/234,194 filed Sep. 20, 2000, which is/are hereby incorporated by reference in its/their entirety.

BACKGROUND OF THE INVENTION

1. Field of the Invention

The present invention relates to an arrayed waveguide grating (AWG: Arrayed Waveguide Grating) type optical multiplexer/demultiplexer applicable as a wavelength selection element to wavelength division multiplexing (WDM: Wavelength Division Multiplexing) transmission systems.

2. Related Background Art

The AWG type optical multiplexer/demultiplexers (hereinafter referred to as AWG circuits) are widely applied to the wavelength selection elements in the WDM transmission systems, as wavelength filters enabling extraction or insertion of a specific wavelength by interference. The AWG circuits do not require so precise machining as required by diffraction gratings or so precise multilayer film formation as required by interference films, but they can be constructed by ordinary microprocessing such as lithography, etching, and soon. Therefore, the AWG circuits are expected to develop into dominant optical components in the future WDM transmission systems, also including the possibility of integration with other light waveguide elements.

Such AWG circuits have the structure in which an input waveguide, an input slab waveguide, channel waveguides (phased array) of mutually different lengths, an output slab waveguide, and output waveguides are integrated on a single substrate.

SUMMARY OF THE INVENTION

FIG. 6 is a plan view to show the waveguide structure of light output part in a conventional AWG circuit (optical multiplexer/demultiplexer). In this AWG circuit, ends of channel waveguides 10 of mutually different lengths are connected at intervals d to one connection surface of output slab waveguide 20. Ends of output waveguides 30 provided corresponding to beams of respective channel wavelengths, i.e., corresponding to respective signal channels are connected to the other connection surface of the output slab waveguide 20.

In general, the connection surface of the output slab waveguide 20 to which the ends of channel waveguides are connected, is designed to work as a convex lens, and one end of each channel waveguide is placed on the circumference of a circle of the radius s (slab length) with the center at a position O1 where the light of the center channel wavelength converges. On the other hand, one end of each output waveguide connected to the other connection surface of the output slab waveguide is placed on the circumference of a Rowland circle 200 having the diameter equal to the slab length (reference is made to Japanese Patent No. 2599786 and "Applied Optics I," the first edition published Jul. 20, 1990 by Baihukan).

However, the signal of the center channel wavelength was surely converged at the point O1, whereas there was the possibility that there occurred decrease of light collection efficiency and distortion of wavelength characteristics due to aberration or the like with the signals of the other channel wavelengths to be converged at points except for the point O1 on the Rowland circle. Specifically, there occurs loss variation of about 4 dB among the channel wavelengths, as illustrated in FIG. 7, in loss spectra of the respective output waveguides (hereinafter referred to as output CHs) in the conventional AWG circuit.

FIG. 8 schematically shows the loss spectrum (of the spectral width W1) in the output waveguide (output CH located near the center) corresponding to the center channel wavelength and the loss spectra (of the spectral width W2 (>W1)) in the output waveguides (output CHs located near the periphery) corresponding to the longest channel wavelength and to the shortest channel wavelength in the signal wavelength band out of the loss spectra illustrated in FIG. 7. As also seen from this FIG. 8, the loss in each output CH increases with increase in the distance from the output CH located near the center, while with increase in the distance from the output CH located near the center, the shape of the loss peak becomes duller and the spectral width of the loss spectrum in each output CH also increases from W1 to W2 (>W1) (distortion of wavelength characteristics); therefore, there was the problem that the wavelength separation accuracy considerably degraded when the signal wavelength band was totally shifted to the longer wavelength side or to the shorter wavelength side.

The present invention has been accomplished in order to solve the problem described above and an object of the invention is to provide an optical multiplexer/demultiplexer having structure for positively compensating for the distortion due to the aberration of wavelength characteristics or the like among the signal channels and permitting effective reduction of the loss variation or the like.

An optical multiplexer/demultiplexer according to the present invention is an AWG type optical multiplexer/demultiplexer applicable as a wavelength selection element to the WDM transmission systems, which comprises a substrate, at least one input waveguide provided on the substrate, a first slab waveguide, a plurality of channel waveguides, a second slab waveguide, and a plurality of output waveguides provided corresponding to respective signal channels.

In the optical multiplexer/demultiplexer according to the present invention, each of the above first and second slab waveguides has a predetermined slab length. The slab length is normally equal to a focal length of an optical input end functioning as a lens surface of each slab waveguide. The above input waveguide is a waveguide for guiding each of the signals of channel wavelengths set as signal channels at predetermined wavelength intervals, to the first slab waveguide, and an optical output end thereof is connected to the optical input end face of the first slab waveguide. The above channel waveguides are waveguides of mutually different lengths, which are flatly arrayed on the substrate in a state in which optical input ends thereof are connected to an optical output end face of the first slab waveguide so as to place the first slab waveguide between the channel waveguides and the input waveguide while optical output ends thereof are connected to the optical input end face of the second slab waveguide so as to place the second slab waveguide between the channel waveguides and the output waveguides. Further, the above output waveguides are waveguides flatly arrayed on the substrate in a state in which optical input ends thereof are connected to an optical output end face of the second slab waveguide, which are waveguides for individually taking out the signals of the channel wavelengths set at the predetermined wavelength intervals.

Particularly, the optical multiplexer/demultiplexer according to the present invention is characterized in that an optical input end of at least either one of the output waveguides is located at a position apart from the optical input end face of the second slab waveguide by a distance shorter than a focal length of the optical input end face of the second slab waveguide. It is preferable that the optical input ends of two output waveguides located outermost out of the output waveguides be placed on the circumference of a Rowland circle having a diameter equal to the focal length of the optical input end face of the second slab waveguide and that the optical input ends of the rest output waveguides excluding the two output waveguides out of the output waveguides be placed inside the Rowland circle and on a line connecting the optical input ends of the two output waveguides. In other words, it is preferable that the optical input ends of at least two output waveguides out of the output waveguides be located at positions where the optical output end face of the second slab waveguide intersects with the circumference of a Rowland circle having a diameter equal to the focal length of the optical input end face of the second slab waveguide. Here the line connecting the optical input ends of the two output waveguides located outermost out of the output waveguides may be part of a straight line (which corresponds to a chord of the above Rowland circle in this case) or part of a curve. Therefore, the optical output end face of the second slab waveguide may be a plane or a curved surface which is convex toward the optical input end face of the second slab waveguide. When the optical input ends of the two output waveguides located outermost out of the output waveguides are placed on the circumference of the Rowland circle in this way, it becomes feasible to decrease the loss variation among the channel wavelengths without increasing the total loss of the optical multiplexer/demultiplexer.

In the optical multiplexer/demultiplexer according to the present invention, it is preferable that extreme portions including the optical input ends of the respective output waveguides extend along a normal direction to the line connecting the optical input ends of the two output waveguides placed on the circumference of the Rowland circle.

When the optical input ends of the above output waveguides are placed on the chord of the Rowland circle, the optical input ends of these output waveguides are preferably arranged at unequal intervals in order to match the converging position of light of each channel wavelength with the center of the optical input end of each output waveguide. Specifically, it is preferable that the optical input ends of the output waveguides be placed so as to decrease the intervals between the optical input ends adjacent to each other from the center of the chord toward the both ends of the chord.

More specifically, the optical input ends of the output waveguides are placed on intersections between the chord and normals passing converging positions of respective light beams of the channel wavelengths converged at equal intervals on the circumference of the Rowland circle or on the circumference of a focal circle indicating converging positions of the light beams emerging from the optical output ends of the channel waveguides, out of normals to the chord of the Rowland circle. Namely, under such conditions that N is the number of the output waveguides, that r is a radius of the Rowland circle or a focal circle indicating converging positions of the respective light beams emerging from the optical output ends of the channel waveguides, and that $\varphi$ is a central angle corresponding to an interval between the converging positions of the respective light beams of the channel wavelengths converging at the equal intervals on the circumference of the Rowland circle or the focal circle; the interval Ln between the optical input end of the nth output waveguide and the optical input end of the (n+1)th output waveguide out of the output waveguides flatly arrayed on the substrate is given by the following equations:

in the case of $n \leq N/2$:

$$Ln = 2r \cdot \sin\frac{\varphi}{2} \cdot \cos\left\{\left(\frac{N}{2} - n\right) \cdot \varphi\right\};$$

in the case other than $n \leq N/2$:

$$Ln = 2r \cdot \sin\frac{\varphi}{2} \cdot \cos\left\{\left(n - 1 - \frac{N}{2}\right) \cdot \varphi\right\}.$$

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 7:
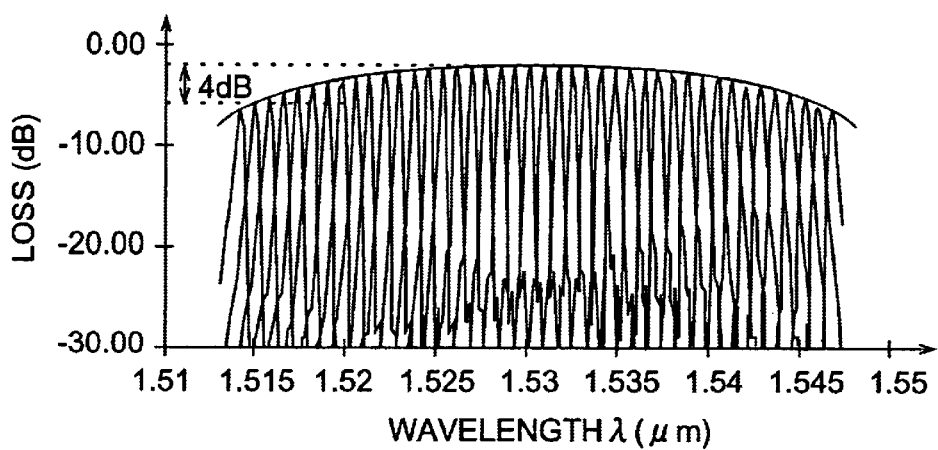
FIG. 7 is loss spectra in the respective output waveguides in the conventional, optical multiplexer/demultiplexer.
Figure 8:
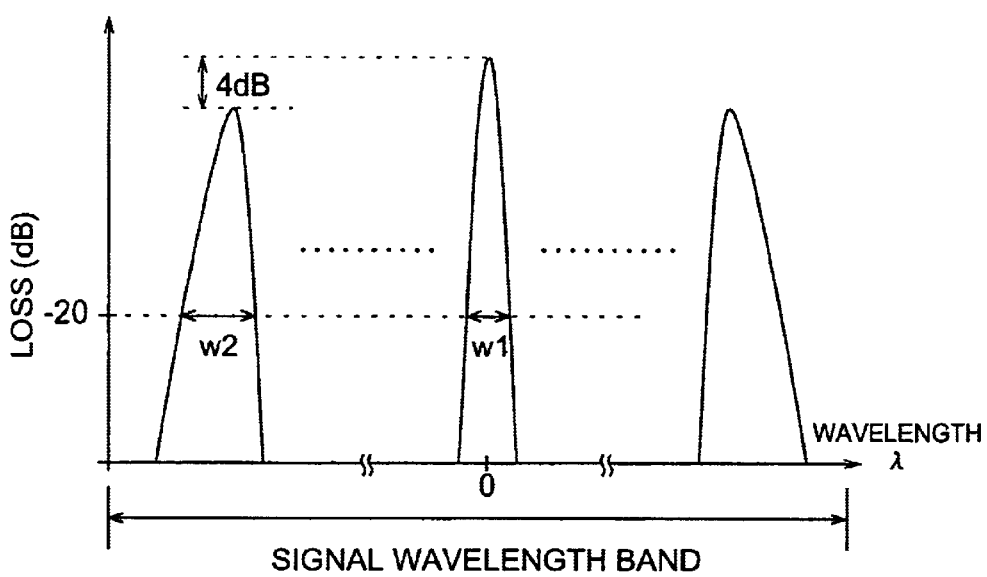
FIG. 8 is a simplified diagram of the loss spectra illustrated in FIG. 7, which is a drawing for explaining the problem arising because of the structural feature of the conventional, optical multiplexer/demultiplexer.

Each of embodiments of the optical multiplexer/demultiplexer according to the present invention will be described hereinafter with reference to FIG. 1 to FIG. 6. In the drawings, the same portions will be denoted by the same numerals and redundant description will be omitted. Reference will also be made to FIG. 7 and FIG. 8 as occasion may demand.

Figure 1:
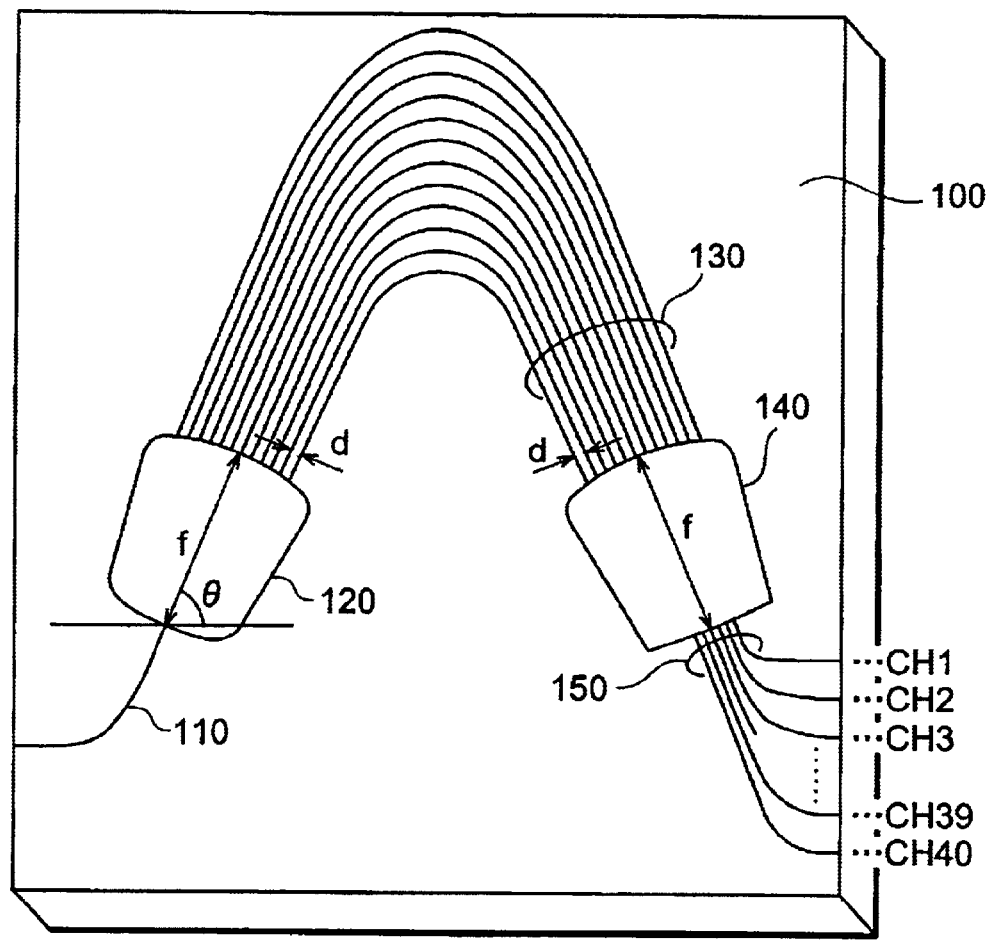
FIG. 1 is a plan view to show the structure of the optical multiplexer/demultiplexer according to the present invention.

FIG. 1 is a plan view to show the structure of the optical multiplexer/demultiplexer according to the present invention. As illustrated in this FIG. 1, the optical multiplexer/demultiplexer is an optical component in which light waveguide portions are integrally made on a silica glass substrate 100. Specifically, there are at least one input waveguide 110, a first slab waveguide 120 (input slab waveguide), a plurality of channel waveguides 130, a second slab waveguide 140 (output slab waveguide), and a plurality of output waveguides 150 provided on the substrate 100. Each of the above waveguide portions is doped with $GeO_2$ and dopant amounts of $GeO_2$ are determined so that the relative refractive-index difference is not less than 1% between the substrate 100 and the waveguide portions in order to permit decrease in the radius of curvature of the channel waveguides 130 (to increase optical confinement efficiency). The substrate 100 does not have to be limited to the silica glass substrate, but it may also be made of a silicon substrate and a glass layer of ten to several ten $\mu$m laid on the silicon substrate. Like action and effect can also be attained where the waveguides doped with $GeO_2$ are formed on this glass layer.

The first slab waveguide 120 is placed at an angle θ relative to the angle of incidence of light into the optical multiplexer/demultiplexer and the first and second slab waveguides 120, 140 each have the total length f shorter than the slab length. The slab length is equal to the focal length of the convex lens surface on the optical input end face in each of the first and second slab waveguides 120, 140. The input waveguide 110 is a waveguide for guiding each of the signals of the channel wavelengths set as signal channels at predetermined wavelength intervals, to the first slab waveguide 120, and the optical output end of this input waveguide 110 is connected to the optical input end face of the first slab waveguide 120. The channel waveguides 130 are waveguides of mutually different lengths, which are flatly arrayed on the substrate 100. These channel waveguides 130 are connected so that the optical input ends thereof are connected as spaced at the intervals d to the optical output end face of the first slab waveguide 120 so as to place the first slab waveguide 120 between the channel waveguides 130 and the input waveguide 110 and so that the optical output ends thereof are connected as spaced at the intervals d to the optical input end face 140a of the second slab waveguide 140 so as to place the second slab waveguide 140 between the channel waveguides 130 and the output waveguides 150. Further, the output waveguides 150 are waveguides flatly arrayed on the above substrate 100 in a state in which the optical input ends thereof are connected to the optical output end face of the second slab waveguide 140, which are provided corresponding to the respective signals of the channel waveguides set at the predetermined wavelength intervals, i.e., corresponding to the respective signal channels. The optical multiplexer/demultiplexer illustrated in FIG. 1 is described as the AWG circuit which implements signal separation of 40 channels and in which light propagates in the order of the input waveguide 110, the first slab waveguide 120, the channel waveguides 130, the second slab waveguide 140, and the output waveguides 150, but an AWG circuit for implementing multiplexing of signals can also be substantiated by providing a plurality of input waveguides corresponding to the respective signal channels.

(First Embodiment)

Figure 2:
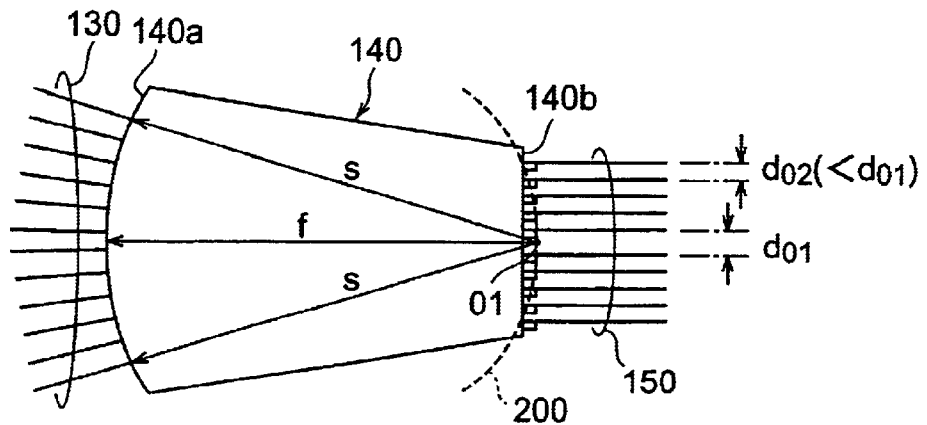
FIG. 2 is a plan view to show the waveguide structure of the light output part in the first embodiment of the optical multiplexer/demultiplexer according to the present invention.

FIG. 2 is a plan view to show the waveguide structure of the light output part (corresponding to the light output part in FIG. 1) in the first embodiment of the optical multiplexer/demultiplexer according to the present invention. In the optical multiplexer/demultiplexer according to the first embodiment, the optical input end face 140a of the second slab waveguide (output slab waveguide) 140 agrees with part of the circumference of the circle of the radius s (equal to the slab length) with the center at the point O1 (the converging position of light of the center channel wavelength outputted from the optical output ends of the channel waveguides 130).

The optical multiplexer/demultiplexer according to the present invention is characterized in that the optical input end of at least either one of the output waveguides 150 is located at the position apart from the optical input end face 140a of the second slab waveguide 140 by the distance f (the total length of the second slab waveguide 140) shorter than the focal length (slab length s) of the optical input end face 140a of the second slab waveguide 140. In the first embodiment, the optical input ends of two output waveguides located outermost out of the output waveguides 150 are placed on the circumference of the Rowland circle 200 having the diameter equal to the focal length s of the optical input end face 140a of the second slab waveguide 140, while the optical input ends of the rest output waveguides 150 except for the two output waveguides out of the output waveguides 150 are placed inside this Rowland circle 200 and on a line connecting the optical input ends of the two output waveguides. In other words, the optical input ends of at least two output waveguides out of the output waveguides 150 are located at the positions where the optical output end face 140b of the second slab waveguide 140 intersects with the circumference of the Rowland circle 200 having the diameter equal to the focal length s of the optical output end face 140a of the second slab waveguide 140. The line connecting the optical input ends of the two output waveguides located outermost out of the output waveguides 150 is equivalent to a chord of the above Rowland circle 200. When the optical input ends of at least the outermost output waveguides out of the output waveguides 150 are placed on the circumference of the Rowland circle 200 as described above, it becomes feasible to decrease the loss variation among the channel wavelengths without increasing the total loss of the optical multiplexer/demultiplexer. In addition, variation can also be decreased in the loss spectral width among the channels.

The decrease in the loss spectrum width is not achieved by placing the output waveguides 150 along normal directions to the Rowland circle 200, but is achieved by decreasing the angle between the longitudinal direction of the second slab waveguide 140 and the output waveguides 150. For example, where the output waveguides 150 are placed along the normal directions to the Rowland circle 200, the loss spectra in the output waveguides located outermost will be of the shape projecting more to the outside, as illustrated in FIG. 8. On the other hand, when the placement angles of the output waveguides 150 (at least at the extreme part) are set so as to decrease the angle to the longitudinal direction of the second slab waveguide 140 as described above, it becomes feasible to prevent light corresponding to the part (W2–W1) projecting more to the outside in each loss spectrum as illustrated in FIG. 8, from being guided to the output waveguides 150, because it is coupled to the cladding mode from the relation between spatial distribution of optical intensity of light entering the output waveguides 150 and the numerical aperture N.A. of the channel waveguides 130.

In the first embodiment, the extreme part including the optical input end of each of the output waveguides 150 is arranged so as to extend along the normal direction to the line connecting the optical input ends of the two output waveguides located on the circumference of the Rowland circle 200 in order to facilitate design and fabrication.

When the optical input ends of the output waveguides 150 are placed on the chord of the Rowland circle 200, the optical input ends of these output waveguides 150 are arranged at unequal intervals in order to match the converging position of light of each channel wavelength with the center of the optical input end of each output waveguide 150. Namely, the interval d01 between the waveguides near the center among the output waveguides 150 is set greater than that d02 between the waveguides near the periphery (see FIG. 2).

Specifically, the inventor designed the AWG circuit enabling the signal separation of 40 channels, in which the signal wavelength intervals $\Delta\lambda$ were 100 GHz.

In the AWG circuit thus designed, the relative index difference was set to 1.5% between the substrate 100 and each waveguide part, the width of each waveguide to 4.3 μm, the minimum radius of curvature $r_{min}$ in the channel waveguides 130 to 2 mm, the size of the substrate 100 to 20 mm×20 mm, the thickness of the substrate 100 to 0.5 mm, the intervals d between the ends of the channel waveguides 130 to 6.0 μm, the number of channel waveguides 130 to 180, the placement angle θ of the first slab waveguide 120 to 80°, and the difference in length ΔL among the channel waveguides 130 to 36.702 μm.

Figure 3:
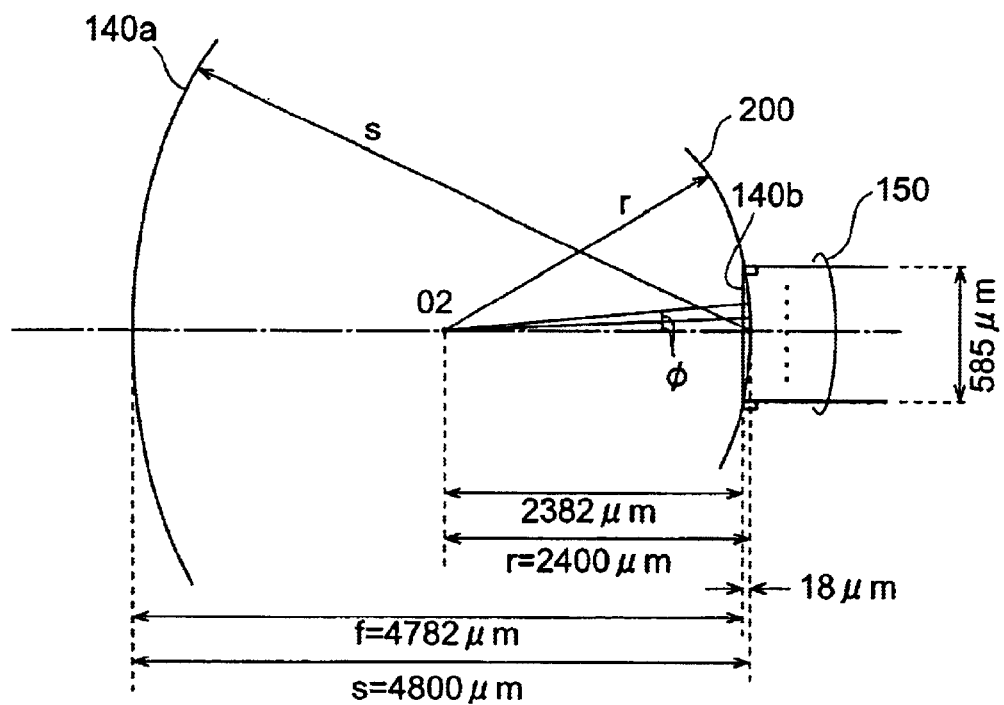
FIG. 3 is a diagram for explaining a specific size of the light output part in the sample produced as the first embodiment of the optical multiplexer/demultiplexer according to the present invention.
Figure 4A:
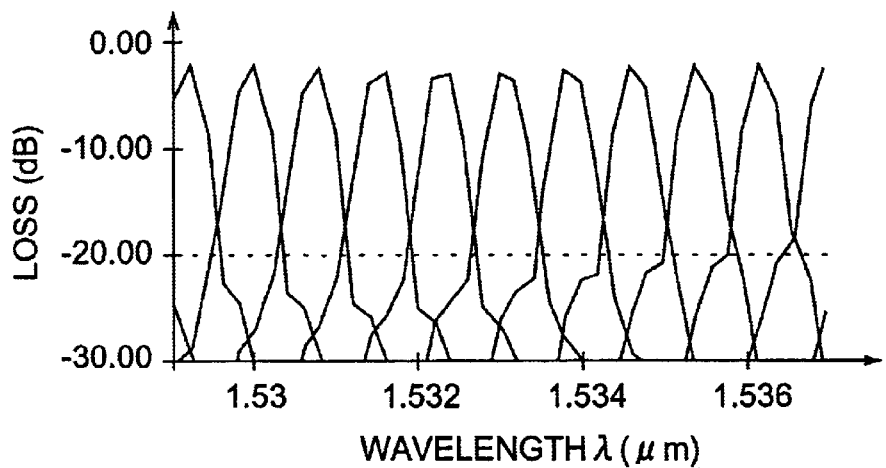
FIGS. 4A and 4B are loss spectra in the respective output waveguides of the sample produced as the first embodiment of the optical multiplexer/demultiplexer according to the present invention.
Figure 4B:
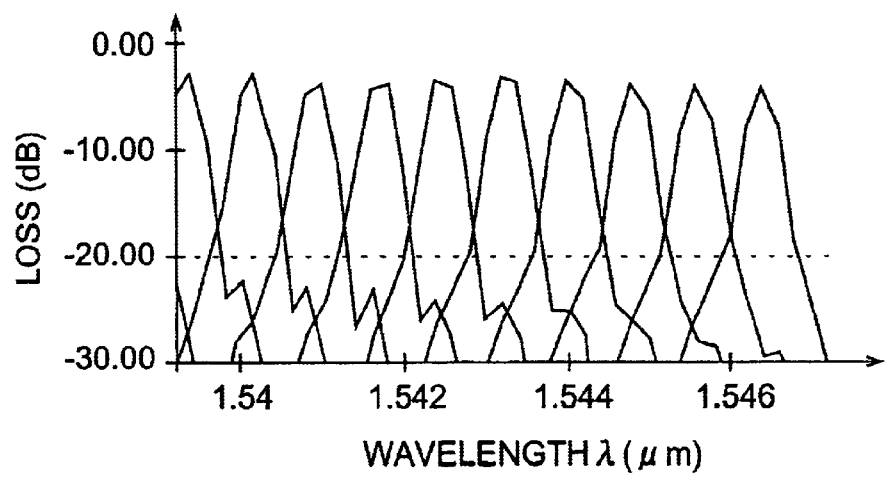

The second slab waveguide 140 was designed as illustrated in FIG. 3. Specifically, the slab length s is 4800 μm, and the diameter of the Rowland circle 200 with the center at the point O2 is 2400 μm (=4800/2). When the array width of the output waveguides 150 is 585 μm and when the optical input ends of the two output waveguides located outermost out of the output waveguides 150 are placed on the circumference of the Rowland circle 200, the distance between the optical input end face 140a of the second slab waveguide 140 and the optical input ends of the rest output waveguides except for these two output waveguides is 18 μm or less shorter than the radius r of the Rowland circle 200 (the total length f of the second slab waveguide 140 is 4782 μm in this case). The wavelength intervals of the signal channels are selected so that the light is converged at equal intervals on the circumference of the Rowland circle 200.

The optical input ends of the output waveguides 150 each are placed on intersections between the chord of the Rowland circle 200 and normals passing the converging positions of the respective light beams of the above channel wavelengths converging at the equal intervals on the circumference of the Rowland circle 200, out of normals to the chord of the Rowland circle 200. Specifically, under such conditions that the number of output waveguides 150 is N, that radius of the Rowland circle 200 is r, and that a central angle corresponding to an interval between the converging positions of the light beams of the channel wavelengths converged at the equal intervals on the circumference of the Rowland circle 200 is φ, the interval Ln between the optical input end of the nth output waveguide and the optical input end of the (n+1)th output waveguide out of the output waveguides 150 flatly arrayed on the substrate 100 is given by the following equations and, for example, the interval between the optical input end of the twentieth output waveguide located near the center and the optical input end of the twenty first output waveguide is set to 15 μm.

in the case of n≦N/2:

$$Ln = 2r \cdot \sin\frac{\varphi}{2} \cdot \cos\left\{\left(\frac{N}{2} - n\right) \cdot \varphi\right\};$$

in the case other than n≦N/2:

$$Ln = 2r \cdot \sin\frac{\varphi}{2} \cdot \cos\left\{\left(n - 1 - \frac{N}{2}\right) \cdot \varphi\right\}$$

The loss spectra in the respective output waveguides of the AWG circuit designed as described above are presented in FIG. 4A and FIG. 4B. With this AWG circuit according to the first embodiment, the maximum loss variation was 1.5 dB among the signal channels. The worst crosstalk was 25 dB between the signal channels. Further, the variation in the loss spectral width at the loss 20 dB among the signal channels was 0.89 to 0.93 nm, and the deviation thereof was 0.04 nm.

In contrast, the conventional AWG circuit showed the maximum loss variation of 4.0 dB among the signal channels, and thus the loss variation is considerably worse than that of the AWG circuit according to the present embodiment. The conventional AWG circuit demonstrated the worst crosstalk of 23 dB between the signal channels, but the variation of 0.85 to 1.16 nm (0.31 nm) in the loss spectral width at the loss 20 dB among the signal channels, which is considerably worse than that in the present embodiment.

As described above, the optical multiplexer/demultiplexer according to the present invention can adequately reduce the loss variation among the signals of the channel wavelengths separated by the output waveguides in comparison with the conventional AWG circuit and also adequately reduce the variation in the spectral width at the loss 20 dB among the signals separated.

(Second Embodiment)

Figure 5:
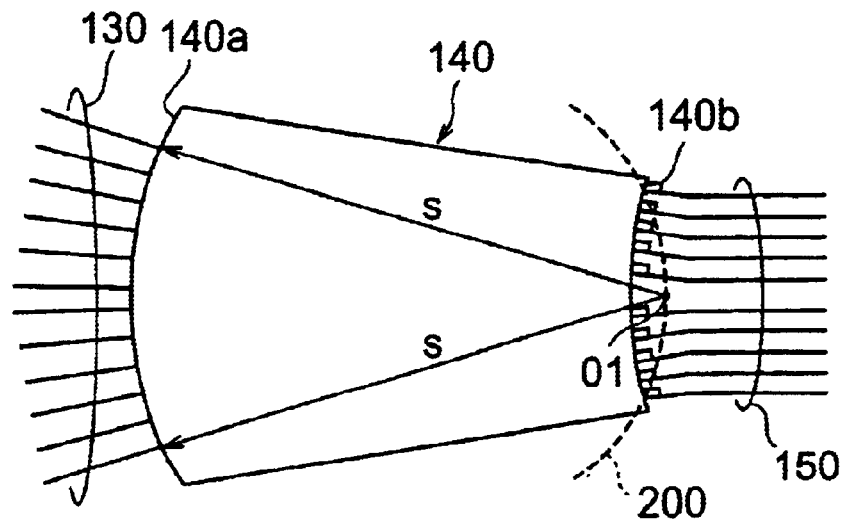
FIG. 5 is a plan view to show the waveguide structure of the light output part in the second embodiment of the optical multiplexer/demultiplexer according to the present invention.
Figure 6:
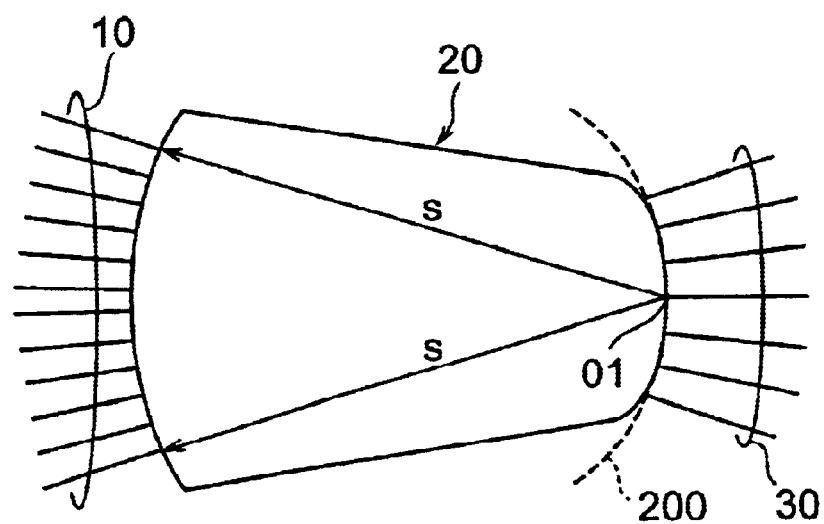
FIG. 6 is a plan view to show the waveguide structure of the light output part in the conventional, optical multiplexer/demultiplexer.

Next, FIG. 5 is a plan view to show the waveguide structure of the light output part (corresponding to the light output part of FIG. 1) in the second embodiment of the optical multiplexer/demultiplexer according to the present invention. The second embodiment is different in the shape of the optical output end face 140b of the second slab waveguide 140 from the first embodiment described above.

In the AWG circuit according to the second embodiment, as illustrated in FIG. 5, the optical input ends of the two output waveguides located outermost out of the output waveguides 150 are placed on the circumference of the Rowland circle 200. On the other hand, the optical input ends of the rest output waveguides except for these two output waveguides located outermost are placed on a curve intersecting with the circumference of the Rowland circle 200 and projecting toward the optical input end face 140a of the second slab waveguide 140.

As described above, the loss and the variation in the loss spectral width among the output waveguides 150 can also effectively be reduced, similarly as in the first embodiment, by the second embodiment wherein the optical input ends of the respective output waveguides 150 are placed on the curve projecting toward the optical input end face 140a of the second slab waveguide 140. It is also preferable in the second embodiment that the extreme part including the optical input end of each output waveguide 150 extend along a normal direction to the curve on which the optical output ends of the output waveguides 150 are placed.

According to the present invention, as described above, the optical input ends of the output waveguides arrayed corresponding to the respective signals of the channel wavelengths set at the predetermined wavelength intervals are arranged so that the optical input end of at least either one of these output waveguides is located inside the Rowland circle. When compared with the optical multiplexer/demultiplexer wherein all the optical input ends of the output waveguides are placed on the circumference of the Rowland circle, the structure of the present invention presents the effect of effectively reducing the distortion due to the aberration of wavelength characteristics or the like among the signal channels, the loss variation among the signal channels, and so on.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical multiplexer/demultiplexer comprising:
   a substrate;
   first and second slab waveguides provided on said substrate, each having a predetermined slab length:
   at least one input waveguide provided on said substrate, said input waveguide having an optical output end connected to an optical input end face of said first slab waveguide;
   a plurality of output waveguides flatly arrayed on said substrate in a state in which optical input ends of said output waveguides are connected to an optical output end face of said second slab waveguide, said output waveguides provided corresponding to respective signals of channel wavelengths set as signal channels at predetermined wavelength intervals; and
   a plurality of channel waveguides flatly arrayed on said substrate in a state in which optical input ends of said channel waveguides are connected to an optical output end face of the first slab waveguide so as to place said first slab waveguide between said channel waveguides and said input waveguide and in which optical output ends of said channel waveguides are connected to an optical input end face functioning as a lens surface of said second slab waveguide so as to place said second slab waveguide between said channel waveguides and said output waveguides, said channel waveguides having mutually different lengths,
   wherein an optical input end of at least either one of said output waveguides is located at a position apart from the optical input end face of said second slab waveguide by a distance shorter than a focal length of the optical input end face of said second slab waveguide.

2. An optical multiplexer/demultiplexer according to claim 1, wherein the optical input ends of two output waveguides located outermost out of said output waveguides are placed on the circumference of a Rowland circle having a diameter equal to the focal length of the optical input end face of said second slab waveguide and wherein the optical input ends of the rest output waveguides excluding said two output waveguides out of said output waveguides are placed inside said Rowland circle and on a line connecting the optical input ends of said two output waveguides.

3. An optical multiplexer/demultiplexer according to claim 1, wherein the optical input ends of at least two output waveguides out of said output waveguides are located at positions where the optical output end face of said second slab waveguide intersects with the circumference of a Rowland circle having a diameter equal to the focal length of the optical input end face of said second slab waveguide.

4. An optical multiplexer/demultiplexer according to claim 2, wherein extreme portions including the optical input ends of the respective output waveguides extend along a normal direction to said line connecting the optical input ends of said two output waveguides placed on the circumference of said Rowland circle.

5. An optical multiplexer/demultiplexer according to claim 2, wherein the optical input ends of said output waveguides are placed on a chord of the Rowland circle connecting the optical input ends of said two output waveguides placed on the circumference of said Rowland circle.

6. An optical multiplexer/demultiplexer according to claim 5, wherein the optical input ends of said output waveguides are arrayed at unequal intervals on said chord.

7. An optical multiplexer/demultiplexer according to claim 6, wherein the optical input ends of said output waveguides are placed so as to decrease the intervals between the optical input ends adjacent to each other from the center of said chord toward the both ends of the chord.

8. An optical multiplexer/demultiplexer according to claim 6, wherein the optical input ends of said output waveguides are placed on intersections between the chord and normals passing converging positions of respective light beams of said channel wavelengths converged at equal intervals on the circumference of said Rowland circle or on the circumference of a focal circle indicating converging positions of the light beams emerging from the optical output ends of said channel waveguides, out of normals to said chord.

9. An optical multiplexer/demultiplexer according to claim 5, wherein, under such conditions that N is the number of said output waveguides, that r is a radius of said Rowland circle or a focal circle indicating converging positions of respective light beams emerging from the optical output ends of said channel waveguides, and that φ is a central angle corresponding to an interval between the converging positions of the respective light beams of said channel wavelengths converging at the equal intervals on the circumference of the Rowland circle or the focal circle; the interval Ln between the optical input end of the nth output waveguide and the optical input end of the (n+1)th output waveguide out of said output waveguides flatly arrayed on said substrate is given by the following equations:

in the case of n≦N/2:

$$Ln = 2r \cdot \sin\frac{\varphi}{2} \cdot \cos\left\{\left(\frac{N}{2} - n\right) \cdot \varphi\right\};$$

in the case other than n≦N/2:

$$Ln = 2r \cdot \sin\frac{\varphi}{2} \cdot \cos\left\{\left(n - 1 - \frac{N}{2}\right) \cdot \varphi\right\}.$$

* * * * *